UNITED STATES PATENT OFFICE.

LEON LOUIS THEODORE LABBÉ, OF ASNIERES, FRANCE.

MANUFACTURE OF CELLULOID OR LIKE SUBSTITUTES.

1,112,297.   Specification of Letters Patent.   Patented Sept. 29, 1914.

No Drawing.   Application filed June 16, 1911.   Serial No. 633,588.

*To all whom it may concern:*

Be it known that I, LEON LOUIS THEODORE LABBÉ, a citizen of the Republic of France, and residing at 2 Rue Henry Say, Asnieres, Department of Seine, France, have invented a new and useful Manufacture of Celluloid or like Substitutes, of which the following is a specification.

The present invention has for its object the manufacture of uninflammable substances which are insoluble in water, and which are more particularly intended for replacing celluloid in its various applications.

In carrying out this process the property of albuminoid solutions of precipitating solutions of silica in the form of collo-silicates, insoluble in water is utilized and also the employment of the silico-glyceric jelly combined with these collo-silicates.

The albuminous collo-silicate can be obtained in the following manner: (*a*) A silicic solution is prepared by adding to a dilute solution of alkaline silicate, such as sodium or potassium silicate, a large excess of hydrochloric acid which leaves the silica in solution. Care must be taken to add the hydrochloric acid in excess as otherwise the silica will be precipitated in the form of jelly. (*b*) A glycero-silicic jelly is then prepared. In the first place a silicic jelly is prepared in the manner indicated above, except that care must be taken not to exceed the quantity of hydro-chloric acid necessary for precipitating the silica of the solution of alkaline silicate. The silicic jelly obtained is then treated by glycerin and caused to boil. (*c*) An albuminoid solution is finally prepared. This solution is either a solution of gelatin or a solution of casein or a solution of these two substances mixed.

The proportions of the solutions (*a*) and (*c*) should be such that the weight of the silicate contained in the solution (*a*) employed is at least equal to 10% of the weight of the albuminoid substances contained in the solution (*c*). The minimum proportion of 10% is necessary for obtaining the formation of the collo-silicate but more than 10% of the silicate may be added if it be desired to increase the hardness of the final product. As regards the glycero-silicic jelly (*b*) it is solely intended for varying the flexibility of the finished product and the necessary quantity for obtaining the desired degree of flexibility is added.

In preparing a solution of gelatin alone 25 gr. of gelatin and 100 gr. of water are heated in a water-bath to about 65° cent. 5 gr. of ordinary acetic acid and 2 gr. of rock alum are added in succession. This is allowed to set preferably in employing a cooling apparatus.

In order to prepare a solution of casein alone borax is added as an additional solvent. Preferably the following proportions are employed:

| | |
|---|---|
| Casein | 15 gr. |
| Water | 100 gr. |
| Borax | 10 gr. |

As already stated the solutions of gelatin and casein can be mixed. These three solutions having been prepared the silicic solution (*a*) is poured into the albuminoid solution (*c*), a precipitate of albuminous collo-silicate is then formed and this is neutralized by the addition of caustic alkali or ammonia. In order to obtain the collo-silicate it is essential that the weight of silicate contained in the solution (*a*) should be at least equal to 10% of the weight of the albuminoid substances in solution (*c*). In this manner a consistent jelly is obtained which retains a large quantity of water. This water is eliminated either wholly or in part according to the product that it is desired to obtain by treating the jelly with absolute alcohol. The jelly of albuminous collo-silicate is then mixed in a mixer with the glyceric jelly (*b*) until a homogeneous mixture is obtained and the complete insolubility of the mixture is then insured by treating with a substance rendering albuminoid substances insoluble, for example substances with a base of formic aldehyde or alum or aluminum acetate or with an equivalent substance and preferably of a titration equal at most to 5%. This is allowed to remain in the bath during a period which depends upon the thickness of the mass in such a manner that it is able to become fully impregnated. It is then placed in a drying apparatus until completely dried. After desiccation and compression an uninflammable celluloid substitute remains. It is of great strength and considerable hardness while its pliability can be modified at will from complete rigidity to the flexibility of fabric by modifying the proportion of glycerin introduced. Hardness and strength are imparted to the final product as already stated by the silica. It is therefore possible to establish a scale of hardness of the product obtained based upon the respective proportions of albuminoid and silica.

For the manufacture of transparent objects such as imitation horn light or spotted tortoise shell and preparation of flexible or rigid photographic films gelatin is employed as the albuminoid solution. For the production of opaque objects such as imitations of wood, marble, onyx, leather and so forth, casein alone or a mixture of casein and gelatin is employed.

In order to obtain the different colorations either with soluble colors or with opaque colors it is advantageous to color the albuminoid solution before mixing the silicic solution with it.

I claim:—

1. The herein described celluloid substitute, which is non-inflammable and insoluble in water, and which consists of a hardened mixture of a glycero-silicic jelly with an albuminous collo-silicate obtained by adding to an albuminoid solution a silicic solution.

2. The herein described process for the manufacture of a non-inflammable celluloid substitute insoluble in water, which consists in adding to an albuminoid solution a silicic solution having an excess of hydrochloric acid, subsequently adding a glycero-silicic jelly, hardening, drying and compressing the resulting product.

In testimony whereof I have signed my name to this specification, in the presence of two subscribing witnesses.

LEON LOUIS THEODORE LABBÉ.

Witnesses:
JACQUES LEJEUNE,
LEON PEILLES.

Copies of this patent may be obtained for five cents each, by addressing the "Commissioner of Patents, Washington, D. C."